(12) United States Patent
Su et al.

(10) Patent No.: US 11,589,225 B2
(45) Date of Patent: *Feb. 21, 2023

(54) APPLICATION WHITE BOX DEVICE UTILIZED IN CONJUNCTION WITH INTELLIGENT TERMINAL

(71) Applicant: Unigroup Guoxin Microelectronics Co., Ltd., Beijing (CN)

(72) Inventors: Linlin Su, Beijing (CN); Daojie Ma, Beijing (CN); Hangyu Huo, Beijing (CN); Quan Sun, Beijing (CN)

(73) Assignee: Unigroup Guoxin Microelectronics Co., Ltd., Beijing (CN)

( * ) Notice: Subject to any disclaimer, the term of this patent is extended or adjusted under 35 U.S.C. 154(b) by 30 days.

This patent is subject to a terminal disclaimer.

(21) Appl. No.: 17/137,044

(22) Filed: Dec. 29, 2020

(65) Prior Publication Data

US 2022/0124492 A1  Apr. 21, 2022

(30) Foreign Application Priority Data

Oct. 16, 2020 (CN) .......................... 202011112533.0

(51) Int. Cl.
| G06F 7/04 | (2006.01) |
| G06F 12/00 | (2006.01) |
| G06F 12/14 | (2006.01) |
| G06F 13/00 | (2006.01) |
| G11C 7/00 | (2006.01) |
| H04W 12/06 | (2021.01) |
| G16Y 30/10 | (2020.01) |
| H04W 12/72 | (2021.01) |
| H04W 12/03 | (2021.01) |
| H04W 12/08 | (2021.01) |

(52) U.S. Cl.
CPC ............ *H04W 12/06* (2013.01); *G16Y 30/10* (2020.01); *H04W 12/03* (2021.01); *H04W 12/08* (2013.01); *H04W 12/72* (2021.01)

(58) Field of Classification Search
CPC ..... H04W 12/06; H04W 12/02; H04W 12/03; H04W 12/04; H04W 12/033
USPC .......................................................... 726/17
See application file for complete search history.

(56) References Cited

U.S. PATENT DOCUMENTS

2009/0031145 A1* 1/2009 Nishiyama ........... H04N 1/4486 713/193
2019/0268169 A1* 8/2019 Castillo ................. H04L 9/0869

FOREIGN PATENT DOCUMENTS

| CN | 210627203 U | 5/2020 |
| WO | WO-2015067056 A1 | 5/2015 |
| WO | WO-201 8219490 A1 | 12/2018 |

OTHER PUBLICATIONS

Extended European Search Report regarding Application No. 20215737.6 dated Apr. 23, 2021.

* cited by examiner

*Primary Examiner* — Brandon Hoffman
*Assistant Examiner* — Samuel Ambaye
(74) *Attorney, Agent, or Firm* — Harness, Dickey & Pierce, P.L.C.

(57) ABSTRACT

An application white box device utilized in conjunction with an intelligent terminal is provided. The application white box device includes a controller, a memory, and a SIM unit. The controller provides support for management of the memory and call of the SIM unit. The memory provides a physical medium for storing data and an application of the intelligent terminal. The SIM unit provides support for (Continued)

encryption and security authentication of the data and the application access of the intelligent terminal.

10 Claims, 7 Drawing Sheets

APPLICATION WHITE BOX DEVICE UTILIZED IN CONJUNCTION WITH INTELLIGENT TERMINAL

CROSS REFERENCE TO RELATED APPLICATION

The present application claims priority to Chinese Patent Application No. 202011112533.0, titled "APPLICATION WHITE BOX DEVICE UTILIZED IN CONJUNCTION WITH INTELLIGENT TERMINAL", filed on Oct. 16, 2020 with the Chinese Patent Office, which is incorporated herein by reference in its entirety.

FIELD

The present disclosure relates to the technical field of communications, and in particular to an application white box device utilized in conjunction with an intelligent terminal.

BACKGROUND

With continuous development of Internet information technology, intelligent terminals are widely used in daily production and life. For example, general-purpose intelligent terminals are used in the technical field of Internet of Things. With the development of the Internet of Things technology, general-purpose intelligent terminals cannot meet specific use requirements. Therefore, an intelligent terminal is to be customized and developed for specific use requirements. Practically, a scale of customizing and developing one intelligent terminal, for example, customized and developed for specific use requirements of only one user or a few users, is relatively small, resulting in a high cost of customizing and developing the intelligent terminal, and thus restricting promotion and popularization of the Internet of Things technology.

In addition, a user may have different security requirements for the intelligent terminal in different application scenarios. Therefore, if one intelligent terminal cannot meet security requirements of the user in different application scenarios, the user may require different intelligent terminals. For example, in one scenario, security authentication is unnecessary and therefore an intelligent terminal A is used. In another scenario, security authentication is required when accessing data and an application of the intelligent terminal, and the intelligent terminal A is not provided with hardware related to security authentication. Therefore, only an intelligent terminal B provided with hardware related to security authentication can be selected. It can be seen that access security of the intelligent terminal restricts application of the intelligent terminal. An intelligent terminal without hardware related to security authentication has low security in accessing data and running an application.

SUMMARY

In view of the above problems, an application white box device utilized in conjunction with an intelligent terminal is provided according to the present disclosure, so as to reduce the cost of the intelligent terminal and improve security of accessing data and running an application of the intelligent terminal.

The following technical solutions are provided according to embodiments of the present disclosure.

An application white box device utilized in conjunction with an intelligent terminal is provided according to an embodiment of the present disclosure. The application white box device includes a controller, a memory, and a subscriber identity module (SIM) unit. Both the memory and the SIM unit are connected to the controller. The controller is connected to the intelligent terminal in a case that the application white box device is utilized in conjunction with the intelligent terminal. The memory includes a data storage space and an application storage space. An application is installed in the application storage space. The application white box device is configured to implement at least one of an application access function, a data storage function, a data transmission function and a data access function.

In an embodiment, the application installed in the application storage space includes a target application. In a case that the application white box device is configured to implement the application access function for the target application, the controller is configured to receive an application access instruction corresponding to the target application from the intelligent terminal, and send the application access instruction to the SIM unit; the SIM unit is configured to authenticate the application access instruction, and send a second authentication result of the application access instruction to the controller; and the controller is further configured to send the second authentication result to the intelligent terminal. The intelligent terminal is configured to output a prompt message including the second authentication result in a case that the second authentication result indicates unsuccessful authentication. The intelligent terminal is further configured to send an application access instruction corresponding to the target application to the controller and the controller is further configured to execute the application access instruction in a case that the second authentication result indicates successful authentication.

In an embodiment, the data storage function includes at least one of a data direct storage function and a data encryption storage function.

In an embodiment, in a case that the application white box device is configured to implement the data direct storage function, the controller is configured to receive data sent by the intelligent terminal and send the data to the data storage space.

In an embodiment, in a case that the application white box device is configured to implement the data encryption storage function, the controller is configured to receive data sent by the intelligent terminal, and send the data to the SIM unit; the SIM unit is configured to encrypt the data and send the encrypted data to the controller; and the controller is further configured to send the encrypted data to the data storage space.

In an embodiment, in a case that the application white box device is configured to implement the data transmission function, the controller is configured to receive data sent by the intelligent terminal and send the data to the SIM unit; the SIM unit is configured to encrypt the data and send the encrypted data to the controller; and the controller is further configured to send the encrypted data to the intelligent terminal, so that the intelligent terminal sends the encrypted data to a target terminal.

In an embodiment, in a case that the application white box device is configured to implement the data access function, the controller is configured to receive an access instruction sent by the intelligent terminal, and send the access instruction to the SIM unit, where the access instruction is sent from a visiting terminal to the intelligent terminal; the SIM unit is configured to authenticate the access instruction and send a first authentication result to the controller; and the controller is further configured to send the first authentication result to the intelligent terminal. The intelligent terminal is configured to feed back the first authentication result to the visiting terminal in a case that the first authentication result indicates unsuccessful authentication. The intelligent terminal is configured to send an access permission instruction to the controller and the controller is further configured to perform an access operation in response to the access permission instruction, in a case that the first authentication result indicates successful authentication.

In an embodiment, in a case that the application white box device is utilized in conjunction with the intelligent terminal, the SIM unit is further connected to the intelligent terminal.

In an embodiment, the application white box device is connected to the intelligent terminal in a pluggable manner.

In an embodiment, in a case that the application white box device is utilized in conjunction with the intelligent terminal, the application white box device is arranged inside or outside a housing of the intelligent terminal.

In an embodiment, the intelligent terminal is any one of a mobile phone, a tablet computer, a headset and an Internet of Things terminal. The Internet of Things terminal is any one of a camera, a vehicle-mounted intelligent terminal, an intelligent three-meter and an industrial control terminal.

In an embodiment, the intelligent terminal includes a control module. The controller is connected to the control module.

Compared with the conventional technology, the present disclosure has the following beneficial effects.

An application white box device is provided according to the technical solutions of the present disclosure. The application white box device may be utilized in conjunction with a general-purpose intelligent terminal. The application white box device includes a controller, a memory, and a SIM unit. Both the memory and the SIM unit are connected to the controller. The controller is connected to the intelligent terminal in a case that the application white box device is utilized in conjunction with the intelligent terminal. The memory includes a data storage space and an application storage space. An application is installed in the application storage space. The application white box device is configured to implement at least one of an application access function, a data storage function, a data transmission function and a data access function. Programs may be configured in the memory based on various requirements. Therefore, the application white box device is utilized in conjunction with the intelligent terminal, so that configuration requirements for hardware and software of the intelligent terminal itself can be greatly reduced, and functions can be implemented by a general-purpose intelligent terminal. Therefore, it is unnecessary to customize and develop an intelligent terminal for specific use requirements, thereby reducing the cost of the intelligent terminal. In addition, the application is installed in the application white box device. The intelligent terminal is required to pass security authentication of the SIM unit when accessing the application, so that operation of the application is secure. Therefore, compared with the conventional technology, the security of accessing the intelligent terminal can be improved by utilizing the application white box device in conjunction with the intelligent terminal.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

Figure 1:
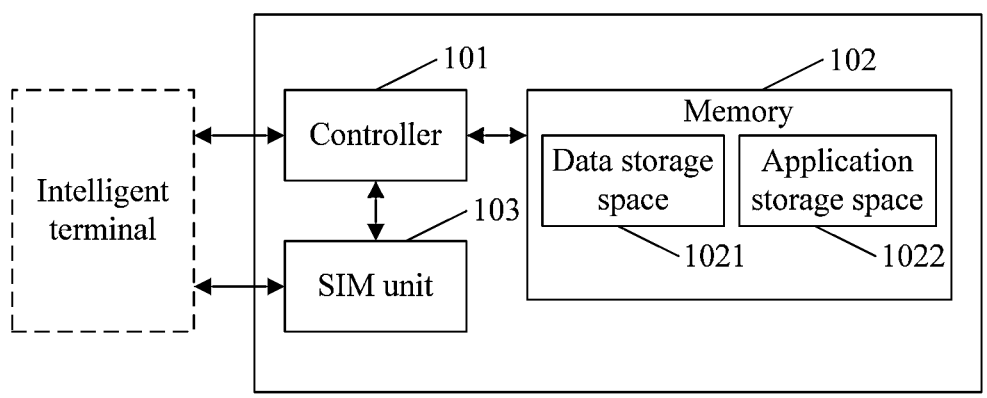
FIG. 1 is a schematic structural diagram of an application white box device utilized in conjunction with an intelligent terminal according to an embodiment of the present disclosure.

As described above, the cost of customizing and developing an intelligent terminal is high currently, and the security of accessing the intelligent terminals is poor.

It is found by the inventor from research that, production efficiency of the intelligent terminal can be improved and the cost of the intelligent terminal can be reduced by promoting generalization and standardization of hardware, and decoupling standardization and customization. In view of this, an application white box device utilized in conjunction with an intelligent terminal is proposed. The application white box device includes a controller, a memory and a subscriber identity module (SIM) unit. Both the memory and the SIM unit are connected to the controller. The controller is connected to the intelligent terminal in a case that the application white box device is utilized in conjunction with the intelligent terminal. The memory includes a data storage space and an application storage space. An application is installed in the application storage space. The application white box device is configured to implement at least one of an application access function, a data storage function, a data transmission function and a data access function. Programs may be configured in the memory based on various requirements. Therefore, the application white box device is utilized in conjunction with the intelligent terminal, so that configuration requirements for hardware and software of the intelligent terminal itself can be greatly reduced, and functions can be implemented by a general-purpose intelligent terminal. Therefore, it is unnecessary to customize and develop an intelligent terminal for specific use requirements, thereby reducing the cost of the intelligent terminal. In addition, the application is installed in the application white box device. The intelligent terminal is required to pass security authentication of the SIM unit when accessing the application, so that operation of the application is secure. Therefore, compared with the conventional technology, the security of accessing the intelligent terminal can be improved by utilizing the application white box device in conjunction with the intelligent terminal according to the embodiment of the present disclosure.

The technical solutions in the embodiments of the present disclosure are described clearly and completely in conjunction with the drawings in the embodiments of the present disclosure hereinafter, so that those skilled in the art can better understand the technical solutions of the present disclosure. It is apparent that the described embodiments are only some rather than all embodiments of the present disclosure. All other embodiments obtained by those skilled in the art based on the embodiments of the present disclosure without any creative work fall within the protection scope of the present disclosure.

White box refers to decoupling between software (for example, data, application and system) and hardware (intelligent terminal). Particularly, an application white box refers to decoupling between applications and an intelligent terminal. That is, the applications are all installed in a white box device and are not installed in the intelligent terminal.

First Embodiment

Reference is made to FIG. 1, which is a schematic structural diagram of an application white box device utilized in conjunction with an intelligent terminal according to an embodiment of the present disclosure.

As shown in FIG. 1, the application white box device utilized in conjunction with an intelligent terminal according to the embodiment of the present disclosure includes a controller 101, a memory 102, and a subscriber identity module (SIM) unit 103. The memory 102 may include a data storage space 1021 and an application storage space 1022. Both the memory 102 and the SIM unit 103 are connected to the controller 101. In a case that the application white box device is utilized in conjunction with the intelligent terminal, the controller 101 is connected to the intelligent terminal. In an example, the controller 101 may communicate with the intelligent terminal by utilizing a data transmission protocol of SD3.0, or a data transmission protocol with a transmission rate higher than that of SD3.0.

It should be noted that, the controller 101 is configured to provide support for management of the memory 102 and call of the SIM unit 103. The memory 102 is configured to provide a physical medium for storing data and an application of the intelligent terminal. The SIM unit 103 is configured to provide support for encryption and security authentication of the data of the intelligent terminal. In addition, the memory 102 is further configured to provide a physical medium for presetting and installation of the application of the intelligent terminal. The SIM unit 103 is configured to provide security support for operation of the application. It should be noted that the memory according to the embodiment of the present disclosure can meet various storage requirements rather than being limited to data storage. In an example, the memory 102 may include the data storage space 1021 and the application storage space 1022. Data is stored in the data storage space 1021, and the application is installed in the application storage space 1022.

In the technical solutions of the present disclosure, the intelligent terminal refers to a terminal device which is capable of computing, storing and communicating, and is provided with a sensor and an input and output interface. In an example, the intelligent terminal may be a portable intelligent terminal such as a mobile phone, a tablet computer, or a headset. Alternatively, the intelligent terminal may be an Internet of Things terminal. A type of the intelligent terminal is not limited herein.

In an example, the Internet of Things terminal may be any one of a camera, a vehicle-mounted intelligent terminal, an intelligent three-meter (including an intelligent water meter, an intelligent electric meter, and an intelligent gas meter), and an industrial control terminal.

For the application white box device according to the embodiment of the present disclosure, white box indicates that the intelligent terminal is utilized in conjunction with the application white box device and therefore data originally required to be stored in the intelligent terminal can be stored in the application white box device, and an application originally required to be installed and run in the intelligent terminal can be installed and run in the application white box device. That is, the application white box device causes the intelligent terminal connected to the application white box device to be white boxed.

For example, in a case that the intelligent terminal is the mobile phone, data and an application in the mobile phone is stored in the memory of the application white box device. A hardware unit (SIM unit) with security authentication in the application white box device can protect the data and the application in the mobile phone. Since the application in the mobile phone is installed in the memory of the application white box device, the user is required to be permitted through the security authentication of the SIM unit to access the application. In a case that the mobile phone is lost, nobody except the user can crack the security authentication of the SIM unit, thereby protecting the security of the data and the application in the mobile phone.

The application white box device is configured to implement at least one of an application access function, a data storage function, a data transmission function and a data access function.

Next, the application access function, the data storage function, the data transmission function and the data access function implemented by the application white box device are described respectively in detail. In the following description, the Internet of Things terminal is taken as an example of the intelligent terminal for illustration. It should be understood that the intelligent terminal that can be utilized in conjunction with the application white box device is not limited to the Internet of Things terminal.

(1) Application Access Function

In the embodiment of the present disclosure, the application installed in the application storage space includes a target application. In order to facilitate description, application access for the target application is taken as an example to describe the application access function according to the present disclosure.

In the embodiment of the present disclosure, in a case that the application white box device is configured to implement the application access function for the target application, the controller is configured to receive an application access instruction corresponding to the target application from the Internet of Things terminal, and send the application access instruction to the SIM unit; the SIM unit is configured to authenticate the application access instruction, and send a second authentication result of the application access instruction to the controller; and the controller is further configured to send the second authentication result to the Internet of Things terminal. The Internet of Things terminal is configured to output a prompt message including the second authentication result in a case that the second authentication result indicates unsuccessful authentication. The Internet of Things terminal is further configured to send an application access instruction corresponding to the target application to the controller and the controller is further configured to execute the application access instruction in a case that the second authentication result indicates successful authentication.

Figure 2A:
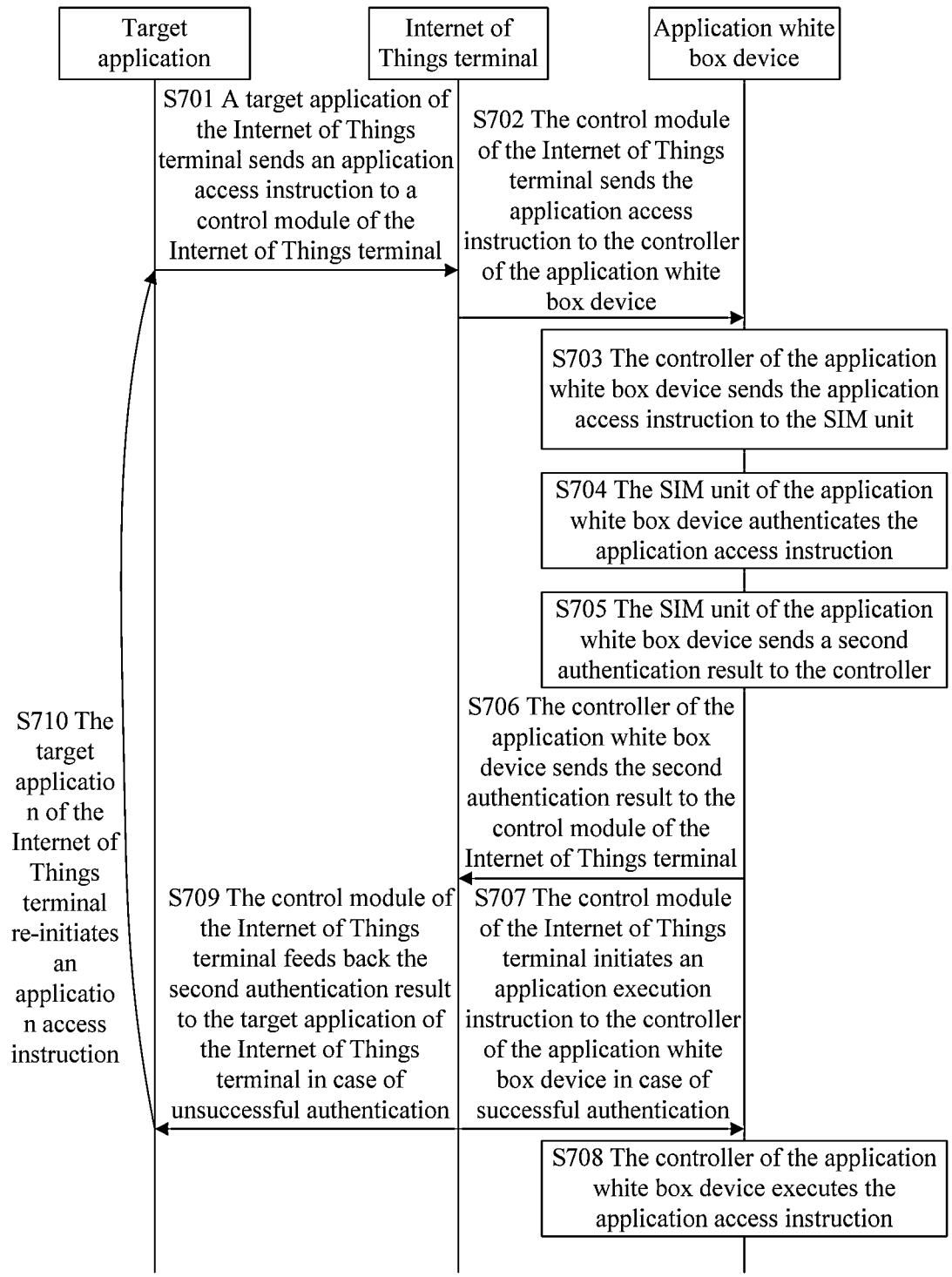
FIG. 2a is a schematic diagram showing signaling of a method for implementing an application access function by the application white box device according to an embodiment of the present disclosure.

Reference is made to FIG. 2a, which is a schematic diagram showing signaling of a method for implementing an application access function by the application white box device according to an embodiment of the present disclosure.

As shown in FIG. 2a, the method for implementing an application access function by the application white box device according to the embodiment of the present disclosure may include the following steps S701 to S710.

In S701, a target application of an Internet of Things terminal sends an application access instruction to a control module of the Internet of Things terminal.

In S702, the control module of the Internet of Things terminal sends the application access instruction to the controller of the application white box device.

In S703, the controller of the application white box device sends the application access instruction to the SIM unit.

In S704, the SIM unit of the application white box device authenticates the application access instruction.

In S705, the SIM unit of the application white box device sends a second authentication result to the controller.

In S706, the controller of the application white box device sends the second authentication result to the control module of the Internet of Things terminal.

In S707, the control module of the Internet of Things terminal initiates an application execution instruction to the controller of the application white box device in case of successful authentication.

In S708, the controller of the application white box device executes the application access instruction.

In S709, the control module of the Internet of Things terminal feeds back the second authentication result to the target application of the Internet of Things terminal in case of unsuccessful authentication.

In S710, the target application of the Internet of Things terminal re-initiates an application access instruction.

In the embodiment of the present disclosure, the application in the Internet of Things terminal is installed in the memory of the application white box device. Therefore, security authentication is performed by the SIM unit in the application white box device every time the application is to be accessed, thereby improving security of the Internet of Things terminal.

(2) Data Storage Function

In the embodiment of the present disclosure, in consideration of high security requirements for data of some Internet of Things terminals currently, the data storage function implemented by the application white box device may include at least one of a data direct storage function and a data encryption storage function.

The data direct storage function and the data encryption storage function are described below with reference to FIGS. 2b and 3 respectively.

In a case that the application white box device is configured to implement the data direct storage function, the controller is configured to receive data sent by the Internet of Things terminal and send the data to the memory.

Figure 2B:
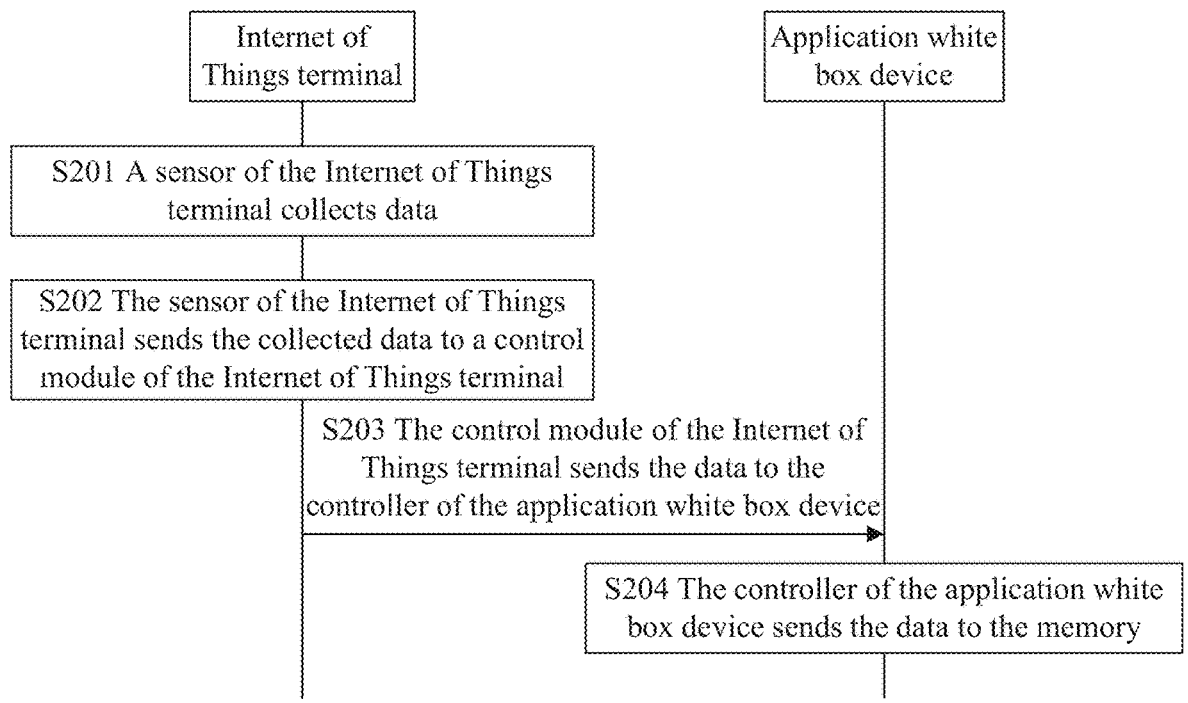
FIG. 2b is a schematic diagram showing signaling of a method for implementing a data direct storage function by the application white box device according to an embodiment of the present disclosure.

Reference is made to FIG. 2b, which is a schematic diagram showing signaling of a method for implementing a data direct storage function by the application white box device according to an embodiment of the present disclosure.

As shown in FIG. 2b, the method for implementing the data direct storage function by the application white box device according to the embodiment of the present disclosure may include the following steps S201 to S204.

In S201, a sensor of the Internet of Things terminal collects data.

In S202, the sensor of the Internet of Things terminal sends the collected data to a control module of the Internet of Things terminal.

In S203, the control module of the Internet of Things terminal sends the data to the controller of the application white box device.

In S204, the controller of the application white box device sends the data to the memory.

In a case that the application white box device is configured to implement the data encryption storage function, the controller is configured to receive data sent by the Internet of Things terminal and send the data to the SIM unit; the SIM unit is configured to encrypt the data and send the encrypted data to the controller; and the controller is further configured to send the encrypted data to the memory. It should be noted that the controller sends the encrypted data to the data storage space of the memory.

Figure 3:
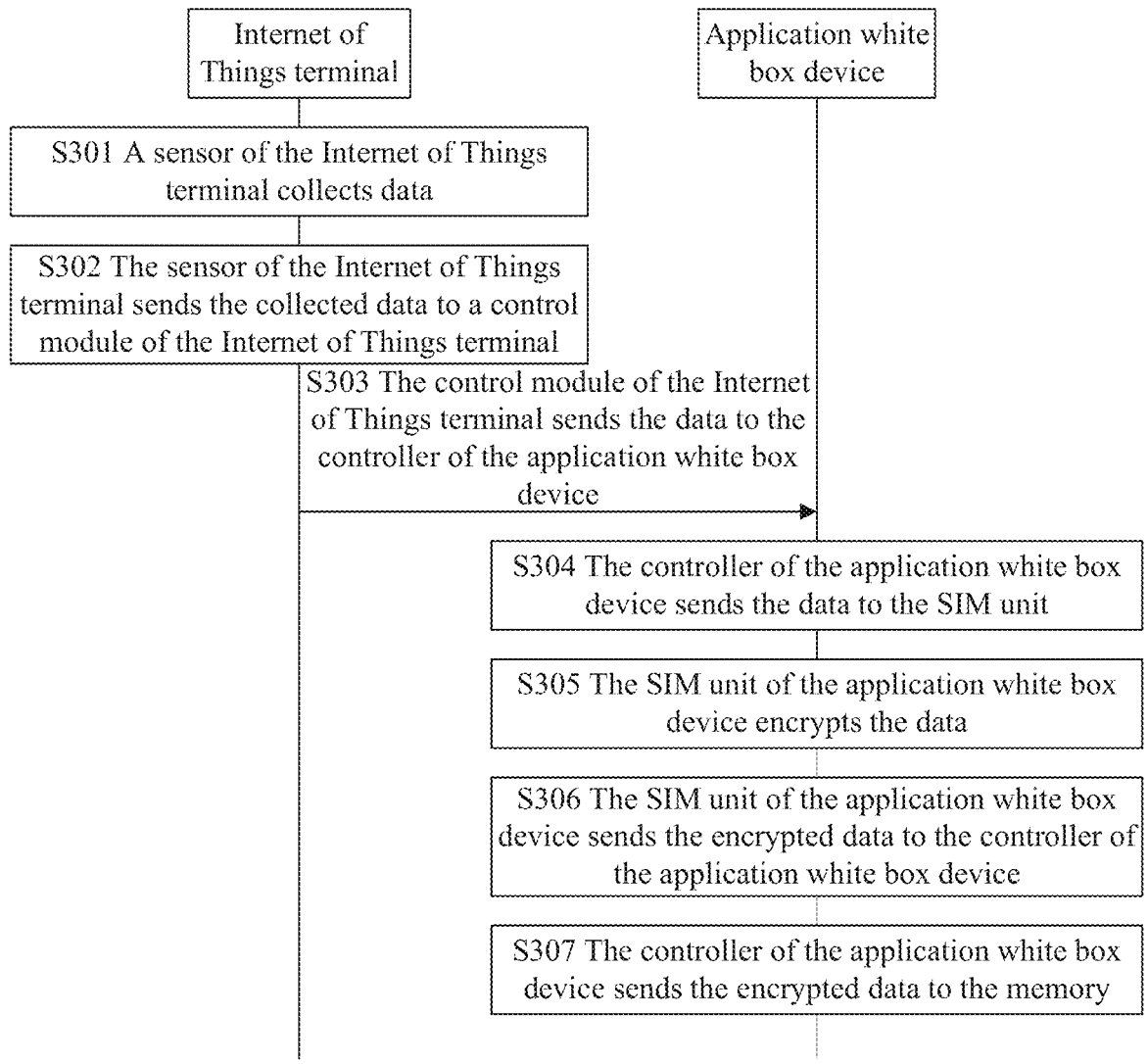
FIG. 3 is a schematic diagram showing signaling of a method for implementing a data encryption storage function by the application white box device according to an embodiment of the present disclosure.

Reference is made to FIG. 3, which is a schematic diagram showing signaling of a method for implementing a data encryption storage function by the application white box device according to an embodiment of the present disclosure.

As shown in FIG. 3, the method for implementing the data encryption storage function by the application white box device according to the embodiment of the present disclosure may include the following steps S301 to S307.

In S301, a sensor of the Internet of Things terminal collects data.

In S302, the sensor of the Internet of Things terminal sends the collected data to a control module of the Internet of Things terminal.

In S303, the control module of the Internet of Things terminal sends the data to the controller of the application white box device.

In S304, the controller of the application white box device sends the data to the SIM unit.

In S305, the SIM unit of the application white box device encrypts the data.

In S306, the SIM unit of the application white box device sends the encrypted data to the controller of the application white box device.

In S307, the controller of the application white box device sends the encrypted data to the memory.

It can be seen from the above two kinds of data storage functions that, the application white box device of the present disclosure can meet not only requirements of some Internet of Things terminals for direct storage of data, but also requirements of some Internet of Things terminals for encryption storage of data without changing hardware configuration of the application white box device. Therefore, it is unnecessary to customize and develop an Internet of Things terminal for specific use requirements, thereby reducing the cost of the Internet of Things terminal.

(3) Data Transmission Function

In the embodiment of the present disclosure, in a case that the application white box device is configured to implement the data transmission function, the controller is configured to receive data sent by the Internet of Things terminal and send the data to the SIM unit; the SIM unit is configured to encrypt the data and send the encrypted data to the controller; and the controller is further configured to send the encrypted data to the Internet of Things terminal, so that the Internet of Things terminal sends the encrypted data to a target terminal. It should be noted that the controller sends the encrypted data to the data storage space of the memory.

Figure 4:
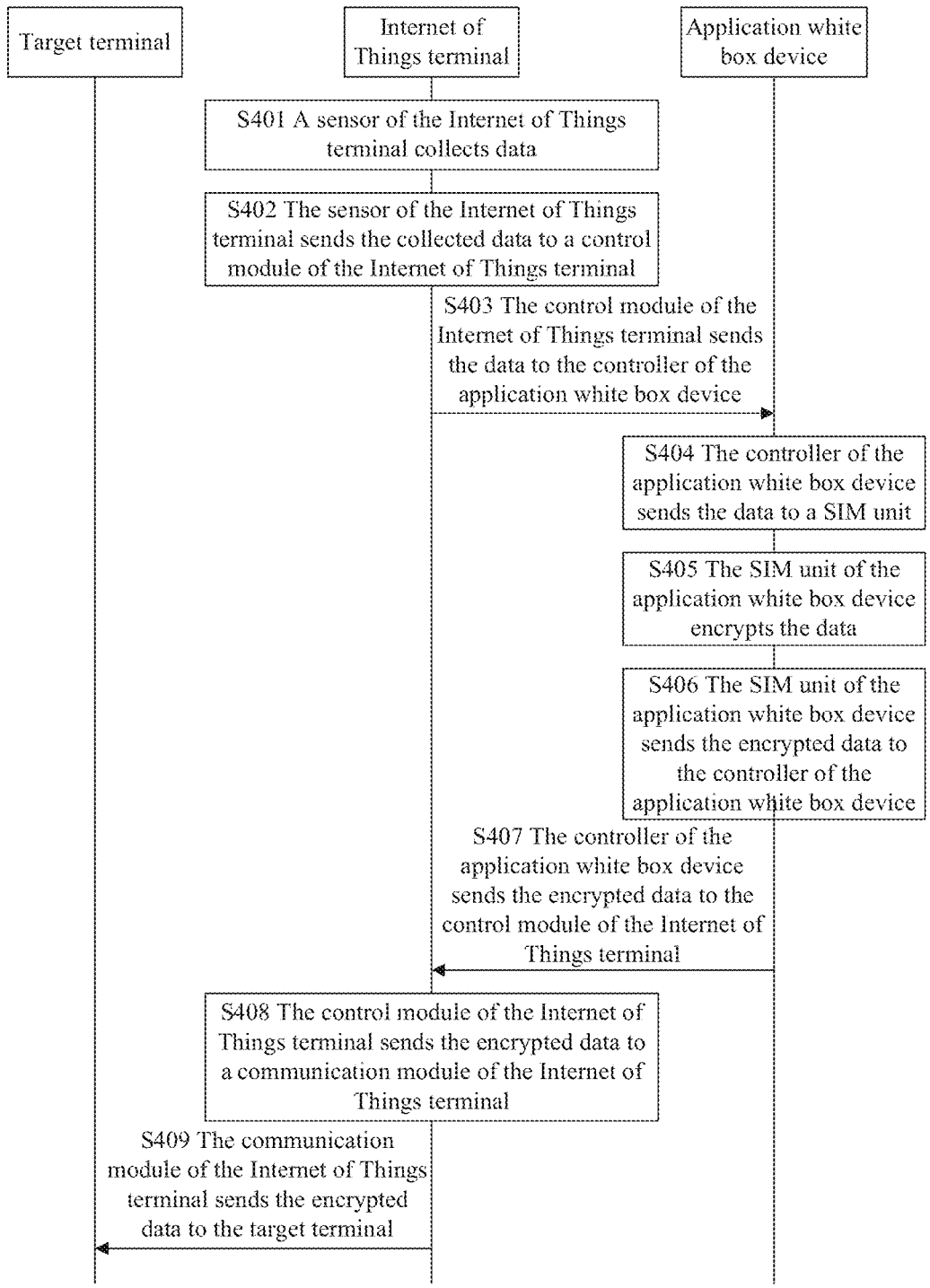
FIG. 4 is a schematic diagram showing signaling of a method for implementing a data transmission function by the application white box device according to an embodiment of the present disclosure.

Reference is made to FIG. 4, which is a schematic diagram showing signaling of a method for implementing a data transmission function by the application white box device according to an embodiment of the present disclosure.

As shown in FIG. 4, the method for implementing the data transmission function by the application white box device according to the embodiment of the present disclosure may include the following steps S401 to S409.

In S401, a sensor of the Internet of Things terminal collects data.

In S402, the sensor of the Internet of Things terminal sends the collected data to a control module of the Internet of Things terminal.

In S403, the control module of the Internet of Things terminal sends the data to the controller of the application white box device.

In S404, the controller of the application white box device sends the data to the SIM unit.

In S405, the SIM unit of the application white box device encrypts the data.

In S406, the SIM unit of the application white box device sends the encrypted data to the controller of the application white box device.

In S407, the controller of the application white box device sends the encrypted data to the control module of the Internet of Things terminal.

In S408, the control module of the Internet of Things terminal sends the encrypted data to a communication module of the Internet of Things terminal.

In S409, the communication module of the Internet of Things terminal sends the encrypted data to a target terminal.

(4) Data Access Function

In the embodiment of the present disclosure, in a case that the application white box device is configured to implement the data access function, the controller is configured to receive an access instruction sent by the Internet of Things terminal, and send the access instruction to the SIM unit, where the access instruction is sent from a visiting terminal to the Internet of Things terminal; the SIM unit is configured to authenticate the access instruction and send a first authentication result to the controller; and the controller is further configured to send the first authentication result to the Internet of Things terminal. In a case that the first authentication result indicates unsuccessful authentication, the Internet of Things terminal is configured to feed back the first authentication result to the visiting terminal. In a case that the first authentication result indicates successful authentication, the Internet of Things terminal is configured to send an access permission instruction to the controller, and the controller is further configured to perform an access operation in response to the access permission instruction.

Figure 5:
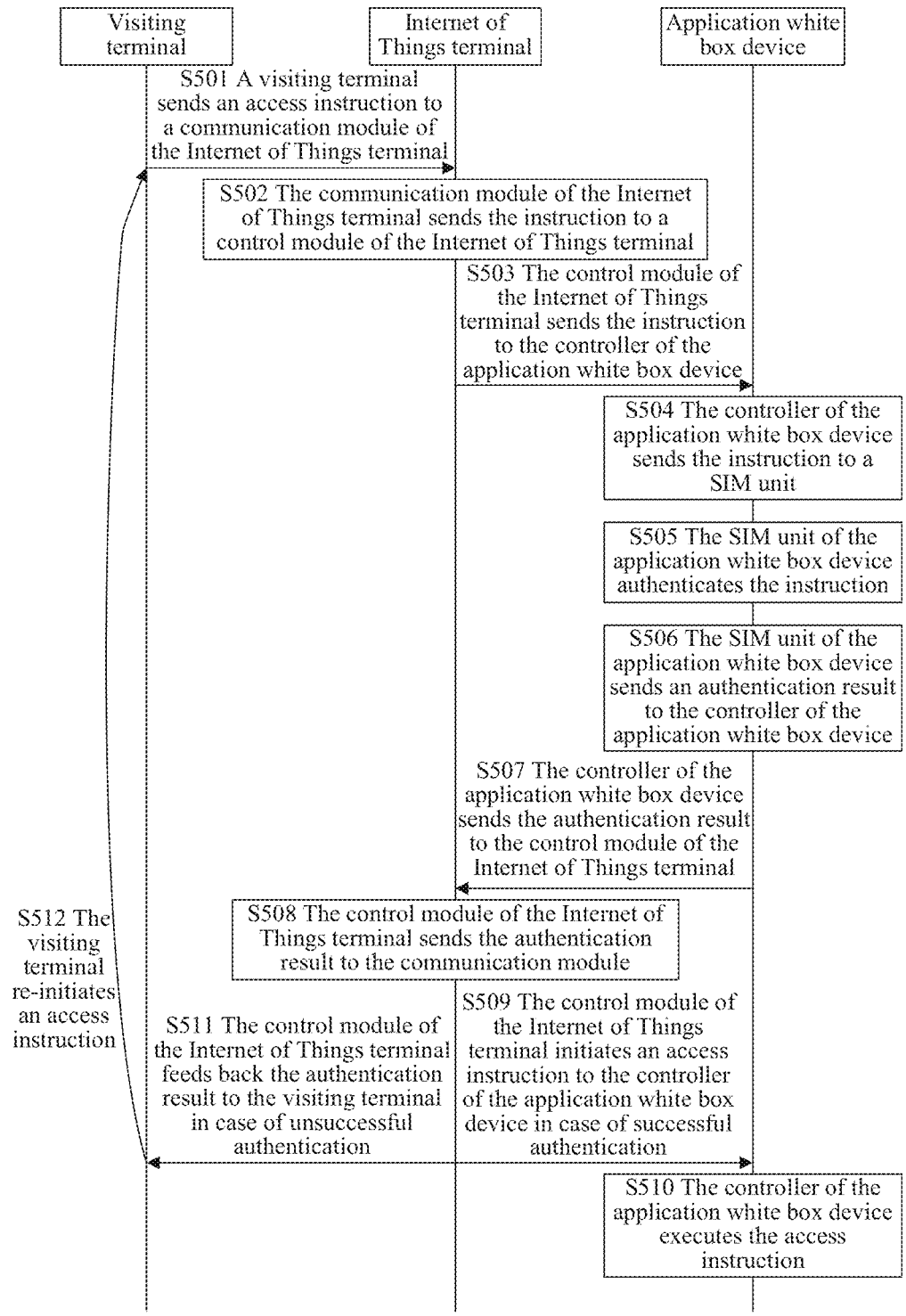
FIG. 5 is a schematic diagram showing signaling of a method for implementing a data access function by the application white box device according to an embodiment of the present disclosure.

Reference is made to FIG. 5, which is a schematic diagram showing signaling of a method for implementing a data access function by the application white box device according to an embodiment of the present disclosure.

As shown in FIG. 5, the method for implementing the data access function by the application white box device according to the embodiment of the present disclosure may include the following steps S501 to S512.

In S501, a visiting terminal sends an access instruction to a communication module of the Internet of Things terminal.

In S502, the communication module of the Internet of Things terminal sends the instruction to a control module of the Internet of Things terminal.

In S503, the control module of the Internet of Things terminal sends the instruction to the controller of the application white box device.

In S504, the controller of the application white box device sends the instruction to the SIM unit.

In S505, the SIM unit of the application white box device authenticates the instruction.

In S506, the SIM unit of the application white box device sends an authentication result to the controller of the application white box device.

In S507, the controller of the application white box device sends the authentication result to the control module of the Internet of Things terminal.

In S508, the control module of the Internet of Things terminal sends the authentication result to the communication module.

In S509, the control module of the Internet of Things terminal initiates an access instruction to the controller of the application white box device in case of successful authentication.

In S510, the controller of the application white box device executes the access instruction.

In S511, the control module of the Internet of Things terminal feeds back the authentication result to the visiting terminal in case of unsuccessful authentication.

In S12, the visiting terminal re-initiates an access instruction.

It can be seen from the detailed description of the data storage function, the data transmission function and the data access function implemented by the application white box device that, the SIM unit may be connected to the Internet of Things terminal in a case that the application white box device is utilized in conjunction with the Internet of Things terminal. It should be noted that the SIM unit is connected to the Internet of Things terminal, thereby sending the encrypted data or the encrypted authentication result to the Internet of Things terminal. In an example, the SIM unit may communicate with the Internet of Things terminal by utilizing 7816 communication protocol.

In the embodiments of the present disclosure, the application white box device may be connected to the Internet of Things terminal in a pluggable manner in order to further expand a range of application of the application white box device and improve flexibility of utilization of the application white box device. In this way, the Internet of Things terminal can be flexibly connected to the application white box device. For example, one application white box device may be connected to multiple Internet of Things terminals so as to implement multiple functions. Alternatively, one Internet of Things terminal may be connected to multiple application white box devices, thereby realizing data sharing among different Internet of Things terminals.

In the embodiments of the present disclosure, in a case that the application white box device is utilized in conjunction with the Internet of Things terminal, the application white box device may be arranged inside or outside a housing of the Internet of Things terminal, which is not limited herein.

Figure 6:
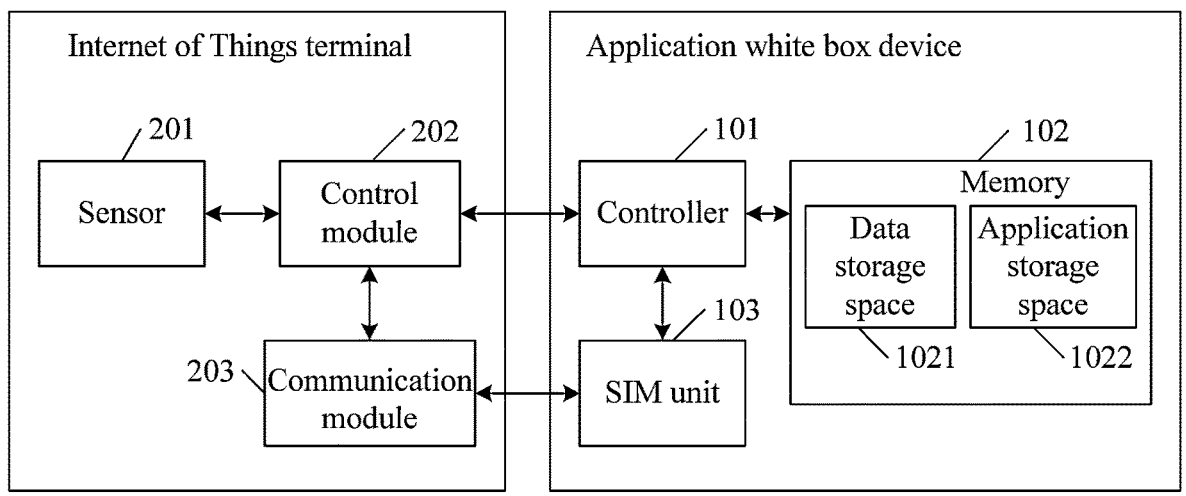
FIG. 6 is a schematic diagram showing connection between the application white box device and an intelligent terminal.

It can be seen from the detailed description of the data storage function, the data transmission function and the data access function implemented by the application white box device that, the Internet of Things terminal may include a control module. The controller of the application white box device may be connected to the control module so as to receive data or an instruction sent by the control module, or send data or an instruction to the control module. In addition, the Internet of Things terminal may further include a sensor for collecting data. The Internet of Things terminal may further include a communication module for communicating with other device and the application white box device. FIG. 6 is a schematic diagram showing connection between the application white box device and an Internet of Things terminal. As shown in FIG. 6, both a sensor 201 and a communication module 203 of the Internet of Things terminal are connected to the control module 202. The control module 202 is connected to the controller 101 of the application white box device. The communication module 203 is further connected to the SIM unit 103 of the application white box device.

It can be seen from the above that, with the technical solutions according to the embodiments of the present disclosure, an application white box device including a controller, a memory and a SIM unit is connected to an Internet of Things terminal, such that a part of functions of the Internet of Things terminal are implemented by a universal application white box device. Therefore, it is unnecessary to customize and develop an Internet of Things terminal for specific use requirements, thereby reducing the cost of the Internet of Things terminal. In addition, the application access function is ensured by the SIM unit of the application white box device, such that the security of accessing the Internet of Things terminal can be improved.

It should be noted that the embodiments in this specification are described in a progressive way, each of which emphasizes the differences from others, and the same or similar parts among the embodiments can be referred to each other. Since the device and system disclosed in the embodiments are substantially similar to the method therein, the description thereof is relatively simple, and for relevant matters, references may be made to the description of the method. The above device and system embodiments are merely illustrative. The units described as separate components may or may not be physically separated, and the component displayed as a unit may or may not be a physical unit, that is, may be located in one place, or may be distributed on multiple network units. Some or all of the modules may be selected based on actual requirements to achieve the object of the technical solutions in the embodiments. Those skilled in the art can understand and implement the technical solutions without any creative work.

Only an implementation of the present disclosure is described above. However, the protection scope of the present disclosure is not limited thereto. Any changes or replacements that may be easily conceived by those skilled in the art within the technical scope disclosed in the present disclosure should fall within the protection scope of the present disclosure. Therefore, the protection scope of the present disclosure should be defined by the claims.

The invention claimed is:

1. An application white box device utilized in conjunction with an intelligent terminal, comprising:
a controller;
a memory; and
a subscriber identity module (SIM) unit, wherein both the memory and the SIM unit are connected to the controller;
the controller is connected to the intelligent terminal in a case that the application white box device is utilized in conjunction with the intelligent terminal;
the memory comprises a data storage space and an application storage space, wherein an application is installed in the application storage space; and
the application white box device is configured to implement at least one of an application access function, a data storage function, a data transmission function and a data access function, wherein the application installed in the application storage space comprises a target application; wherein in a case that the application white box device is configured to implement the application access function for the target application,
the controller is configured to receive an application access instruction corresponding to the target application from the intelligent terminal, and send the application access instruction to the SIM unit;
the SIM unit is configured to authenticate the application access instruction, and send a second authentication result of the application access instruction to the controller;
the controller is further configured to send the second authentication result to the intelligent terminal;
the intelligent terminal is configured to output a prompt message comprising the second authentication result in a case that the second authentication result indicates unsuccessful authentication; and
the intelligent terminal is further configured to send an application access instruction corresponding to the target application to the controller and the controller is further configured to execute the application access instruction in a case that the second authentication result indicates successful authentication.

2. The application white box device according to claim 1, wherein the data storage function comprises at least one of a data direct storage function and a data encryption storage function.

3. The application white box device according to claim 2, wherein in a case that the application white box device is configured to implement the data direct storage function, the controller is configured to receive data sent by the intelligent terminal and send the data to the data storage space.

4. The application white box device according to claim 2, wherein in a case that the application white box device is configured to implement the data encryption storage function,
the controller is configured to receive data sent by the intelligent terminal, and send the data to the SIM unit;
the SIM unit is configured to encrypt the data and send the encrypted data to the controller; and
the controller is further configured to send the encrypted data to the data storage space.

5. The application white box device according to claim 1, wherein in a case that the application white box device is configured to implement the data transmission function,
the controller is configured to receive data sent by the intelligent terminal and send the data to the SIM unit;
the SIM unit is configured to encrypt the data and send the encrypted data to the controller; and
the controller is further configured to send the encrypted data to the intelligent terminal, wherein the intelligent terminal sends the encrypted data to a target terminal.

6. The application white box device according to claim 1, wherein in a case that the application white box device is utilized in conjunction with the intelligent terminal, the SIM unit is further connected to the intelligent terminal.

7. The application white box device according to claim 1, wherein the application white box device is connected to the intelligent terminal in a pluggable manner.

8. The application white box device according to claim 1, wherein in a case that the application white box device is utilized in conjunction with the intelligent terminal, the application white box device is arranged inside or outside a housing of the intelligent terminal.

9. The application white box device according to claim 1, wherein the intelligent terminal is any one of a mobile phone, a tablet computer, a headset and an Internet of Things terminal, wherein the Internet of Things terminal is any one of a camera, a vehicle-mounted intelligent terminal, an intelligent three-meter and an industrial control terminal.

10. The application white box device according to claim 1, wherein the intelligent terminal comprises a control module, wherein the controller is connected to the control module.

* * * * *